United States Patent Office 3,059,022
Patented Oct. 16, 1962

---

3,059,022
2 LOWER ALKYL-2(1-ETHYLPROPYL)-1,3-PROPANEDIOL DICARBAMATES
Frank M. Berger, Princeton, and Bernard J. Ludwig, North Brunswick, N.J., assignors to Carter Products, Inc., New York, N.Y., a corporation of Maryland
No Drawing. Filed Mar. 16, 1959, Ser. No. 799,480
3 Claims. (Cl. 260—482)

This invention relates to novel organic compounds and has for its object the provision of new compounds which have highly effective sleep-producing characteristics. More particularly, the hypnotic compounds of this invention are 2-methyl-2-(1-ethyl propyl)-1, 3-propanediol dicarbamate and 2-ethyl-2-(1-ethyl propyl)-1,3-propanediol dicarbamate.

A commonly used technique in determining the efficacy of a material as a hypnotic is to take electroencephalographs of the subject to whom such drug has been administered. Electroencephalographs, commonly referred to as "EEG" graphs or recordings, are brain wave measurements of the cortex, the cortex being the center of conciousness of the brain. By such measurements it is possible to study and compare brain waves of the cortical region during sleep and consciousness. It is well recognized that sleep is always accompanied by characteristic changes in brain waves. The EEG measurements are a commonly used criterion for camparing sleep and wakefulness are shown by numerous books and publications such, for example, as an article entitled "Consciousness and Sleep" by Charles W. Simon and William H. Emmons, which appears in "Science," Nov. 30, 1956, vol. 124, pp. 1066–1069, and Atlas of Electroencephalography by Gibbs and Gibbs, 2nd edition, 1950.

The above referred to publications, as well as other leading publications on electroencephalography, show the marked differences between brain wave recordings during sleep when compared with those taken during wakefulness. During sleep, whether natural sleep or that produced by a hypnotic (sleep producer) there is a marked reduction in cortical activity over that observed during wakefulness. Accordingly, during sleep there is a marked slowing down of the brain waves. It is generally known that true hypnotics or sleep producers produce brain wave recordings indistinguishable or very similar to those obtained from natural sleep. It is common practice to give patients a dose of a known hypnotic such as "Seconal" (a barbiturate) to obtain a record of the brain waves during sleep.

It follows, therefore, that an agent which significantly reduces cortical activity or slows down the brain waves is considered to be a true hypnotic or sleep producer, while an agent which has little or no effect on the brain waves is not a true sleep producer.

When the compounds of this invention were tested in cats for their ability to produce sleep, they were found to have intensive hypnotic properties. It was also found that the dosages required to produce sleep are smaller than those exerting a marked paralyzing action on voluntary muscles.

In the above referred to investigation on cats, ten agents were compared with respect to sleep-producing properties as measured by EEG measurements. The agents tested were as follows:

Compound 1—2-methyl-2-(1-ethyl propyl)-1,3-propanediol dicarbamate
Compound 2—2-ethyl-2-(1-ethyl propyl)-1,3-propanediol dicarbamate
Compound 3—2-methyl-2-n-amyl-1,3-propanediol dicarbamate
Compound 4—2-methyl-2-(1-methyl butyl)-1,3-propanediol dicarbamate
Compound 5—2-methyl-2-(3-methyl butyl)-1,3-propanediol dicarbamate
Compound 6—2-ethyl-2-n-amyl-1,3-propanediol dicarbamate
Compound 7—2-ethyl-2-(1-methyl butyl)-1,3-propanediol dicarbamate
Compound 8—2-ethyl-2-(3-methyl butyl)-1,3-propanediol dicarbamate
Compound 9—2-methyl-2-n-propyl-1,3-propanediol dicarbamate.

Each of the above compounds were administered to cats in a dose of 20 mg./kg. EEG recordings were taken and compared with a control recording wherein no drug was administered. Of the compounds tested, only Compound 1, and Compound 2, the compounds of this invention, had a striking effect on cortical potentials. The changes produced by these drugs indicated a general slowing of cortical activity such as is produced during sleep or under the influence of hypnotic drugs. On the other hand, Compounds 3, 4 and 5, which are isomers of Compound 1, and Compounds 6 and 7, which are isomers of Compound 2, had no or a very slight and temporary effect on cortical potentials, thus indicating that the aforementioned isomers of the compounds of this invention are not effective sleep-producing agents. Compound 8, an isomer of Compound 2, could not be injected in doses of 20 mg./kg. without killing the animal. This compound had no effect on cortical potentials in the largest dose tolerated by the animal. Compound 9, which is meprobamate, a well known tranquilizer, had no effect on cortical potentials, and thus is not a true hypnotic.

The aforementioned compounds of this invention are white crystalline solids soluble in most organic solvents, but soluble to only a slight degree in water. They form stable solutions in water and organic solvents. Upon heating or boiling with acid or alkali, these compounds hydrolyze to give the corresponding 2-,2-disubstituted 1,3-propanediol, ammonia and carbon dioxide.

The novel compounds may be prepared by reacting the appropriate 2-alkyl-2-alkyl-1,3-propanediol with phosgene to form the corresponding di-chlorocarbonate derivative. This reaction is promoted by the addition to the reacting compounds of acid combining agents such as sodium hydroxide, antipyrine, dialkylaniline, and the like. The di-chlorocarbonate derivative is then converted to the dicarbamate by ammoniation, using either anhydrous or aqueous ammonia.

The compounds may also be prepared from the appropriate diol by ester exchange using a low molecular weight urethane. In this reaction the low molecular weight alcohol contained in 2 equivalents of urethane is replaced by the appropriate 2,2-dialkyl-1,3-propanediol to give the desired dicarbamate.

The appropriate 2,2-dialkyl-1,3-propanediols used in making the novel compounds may be prepared by any known method as, for example, by the reduction of the corresponding di-substituted malonic ester.

The novel compounds of this invention may also be prepared by reacting the appropriate 2,2-dialkyl-1,3-propanediol with cyanic acid in an anhydrous medium to form the desired discarbamate.

To describe the invention more particularly, examples are given to illustrate various methods of preparation of the novel compounds of this invention. In the following examples, it will be observed that the examples having letter headings relate to the preparation of compounds used as intermediates in the preparation of the compounds of this invention. The examples having numerical headings relate to the preparation of the compounds of this invention.

The following examples relate to the preparation of intermediates used in the preparation of 2-methyl-2-(1-ethyl propyl)-1,3-propanediol dicarbamate, and to the preparation of said dicarbamate.

EXAMPLE A

*Preparation of Diethyl-(Methyl-1-Ethylpropyl)-Malonate*

To a stirred solution of 112 grams of diethyl methyl malonate in 1000 ml. of anhydrous toluene, there is added 16.5 grams of sodium hydride. When hydrogen evolution is complete, 116 grams of 3-bromopentane in 500 ml. toluene are added and the solution refluxed with stirring for about 36 hours. The sodium bromide is removed by filtration and the filtrate distilled to remove the toluene. The residue is fractionally distilled under reduced pressure. The fraction distilling at 116 to 127° C. at 9 mm. pressure is collected. Yield 56 grams $n_D^{25}$ 1.4377.

EXAMPLE B

*Preparation of 2-Methyl-2-(1-Ethylpropyl)-1,3-Propanediol*

55 grams of diethyl-(methyl-1-ethylpropyl)-malonate are reduced in the usual manner using 13 grams of lithium aluminum hydride in a suitable volume of anhydrous ethyl ether. The excess hydride is decomposed using 20 ml. ethyl acetate and 127 ml. of water are added to hydrolyze the lithium aluminum-diol complex. The upper ether layer is removed and the solid oxides are washed with two 100 ml. volumes of ether. The combined ether solutions are dried over anhydrous sodium carbonate and the ether removed by distillation. The oily residue remaining is distilled under reduced pressure and the fraction distilling at 87–92° C. at 0.075 mm. pressure is collected. $n_D^{25}$ 1.4621. On dissolving this product in warm petroleum ether and allowing the solution to stand with cooling, a crystalline solid is obtained. Melting point 45–48°. Analysis: Calculated for $C_9H_{20}O_2$. C, 67.48%; H, 12.58%. Found: C, 67.38%; H, 12.12%.

EXAMPLE 1

*Preparation of 2-Methyl-2-(1-Ethylpropyl)-1,3-Propanediol Dicarbamate by Ester Exchange Reaction*

16 grams of 2-methyl-2-(1-ethylpropyl)-1,3-propanediol and 19.6 grams of ethyl urethane are dissolved in about 300 ml. anhydrous xylene. 1.6 grams of aluminum isopropylate are added and the mixture distilled to remove the ethyl alcohol formed in the condensation of ethyl urethane and the diol. The alcohol distills in the form of an azeotrope with xylene. Distillation is continued until substantially the calculated volume of ethanol has been removed. The xylene is distilled from the mixture under reduced pressure, 200 ml. water are added and distilled to remove final traces of xylene. The residue is dissolved in 200 ml. of hot 20% isopropanol in water, the solution filtered and the filtrate allowed to cool. On standing the product separates in the form of colorless crystals in a yield of about 40% of theoretical. It can be further purified by recrystallization from benezene or from water. Melting point of purified compound 118–120° C. Solubility in water approximately 0.1%. Analysis: Calculated for $C_{11}H_{22}O_4N_2$. N, 11.38%. Found: N, 11.68%.

EXAMPLE 2

*Preparation of 2-Methyl-2-(1-Ethylpropyl)-1,3-Propanediol Dicarbamate Using Phosgene Method*

To a mixture of 33 g. of phosgene in 150 ml. of anhydrous toluene cooled to −10° C. there is added 24 g. of 2-methyl-2-(1-ethylpropyl)-1,3-propanediol dissolved in 100 ml. toluene and 31.3 g. of dimethyl aniline. The temperature of the reaction mixture is maintained at between −5° and +5° during the addition. The mixture is permitted to react without further cooling for an additional four hours. It is then cooled to about 0° and extracted with 150 ml. of 5% hydrochloric acid. The toluene portion is dried over a suitable drying agent and treated with anhydrous ammonia while maintaining the temperature at about 25° C. The resulting mixture is warmed and filtered to remove the ammonium chloride and the product obtained by concentrating the filtrate. The crude product is purified by recrystallization from hot water. It has the physical properties identical to those given above.

EXAMPLE 3

*Preparation of 2-Methyl-2-(1-Ethylpropyl)-1,3-Propanediol Dicarbamate Using Cyanic Acid Method*

16 g. of 2-methyl-2-(1-ethylpropyl)-1,3-propanediol and 15 g. of anhydrous sodium cyanate are stirred in 200 ml. of anhydrous chloroform in a suitable vessel equipped with a gas inlet tube, stirrer and thermometer. While cooling the mixture to 0–5° C., anhydrous hydrogen chloride is passed into the stirred mixture slowly for five hours. The mixture is then allowed to stand at room temperature overnight. The solid material is separated by filtration and the chloroform solution concentrated under reduced pressure. The residue is purified by recrystallization from hot benzene solution. It has the physical properties identical to those listed above.

The following examples related to the preparation of intermediates used in the preparation of 2-ethyl-2-(1-ethylpropyl)-1,3-propanediol dicarbamate, and to the preparation of said dicarbamate.

EXAMPLE C

*Preparation of Diethyl-(Ethyl-1-Ethylpropyl)-Malonate*

1.0 mole of diethyl ethyl malonate in 1500 ml. of toluene is reacted with 1.1 moles of 3-bromopentane as described in Example A above. The product is fractionally distilled under reduced pressure. The portion distilling at 131–138° C. at 10 mm. was collected. Yield 95 g. $n_D^{25}$ 1.4367.

EXAMPLE D

*Preparation of 2-Ethyl-(1-Ethylpropyl)-1,3-Propanediol*

90 g. of diethyl-(ethyl-1-ethylpropyl)-malonate are reduced with 20.1 g. of lithium aluminum hydride as described in Example B above. The residue on distillation yielded 41.5 g. of diol distilling at 76–77° C. at 0.02 mm. $n_D^{25}$ 1.4643. Analysis: Calculated for $C_{10}H_{22}O_2$. C. 68.90%; H, 12.73%. Found: C, 69.03%; H, 12.49%.

EXAMPLE 4

*Preparation of 2-Ethyl-2-(1-Ethylpropyl)-1,3-Propanediol Dicarbamate by Ester Exchange Method*

17.4 g. of 2-ethyl-2-(1-ethylpropyl)-1,3-propanediol were converted to the dicarbamate using ethyl urethane in an ester exchange reaction as described in Example 1 above. The material obtained on removal of the solvent was recrystallized from hot 20% isopropanol and then from benzene. 8.6 g. of pure dicarbamate was obtained. Melting point of purified compound 119–121° C. Solubility in water approximately 0.1%. Analysis: Calculated for $C_{12}H_{24}O_4N_2$. Nitrogen 10.76%. Found: Nitrogen 11.01%.

EXAMPLE 5

*Preparation of 2-Ethyl-2-(1-Ethylpropyl)-1,3-Propanediol Dicarbamate Using Phosgenation Method*

2-ethyl-2-(1-ethylpropyl)-1,3-propanediol is reacted with phosgene to form the corresponding di-(chlorocarbonate) and this product reacted with ammonia to give the corresponding dicarbamate as described in Example 2 above. The product obtained is identical to that obtained from the ester exchange reaction in above Example 4.

EXAMPLE 6

*Preparation of 2-Ethyl-2-(1-Ethylpropyl)-1,3-Propanediol Dicarbamate by Cyanic Acid Procedure*

2-ethyl-2-(1-ethylpropyl)-1,3-propanediol when reacted with cyanic acid in accordance with the method described in Example 3 above yielded a product identical to that obtained from the ester exchange reaction described in Example 4 above.

The compounds of this invention are preferably administered orally in the form of pills, tablets, capsules or solutions formed by conventional methods. When the active ingredient is administered in the form of a solid, a typical tablet composition comprises 0.05 to 0.5 g. of active ingredient intermixed in a dry pulverulent state with gelatin, starch, alginic acid and magnesium stearate and pressed into a tablet.

When administered in the form of liquid, it may be dissolved in a suitable solvent such as a mixture of polyethylene glycol and water in a suitable ratio.

In general, an effective dose of the active compound is in the range of about 0.05 to about 2 g.

What is claimed is:

1. A compound selected from the group consisting of 2-methyl-2-(1-ethylpropyl)- 1,3-propanediol dicarbamate and 2-ethyl-2-(1-ethylpropyl)- 1,3-propanediol dicarbamate.

2. 2-methyl-2-(1-ethylpropyl)-1,3-propanediol dicarbamate.

3. 2-ethyl-2-(1-ethylpropyl)-1,3-propanediol dicarbamate.

References Cited in the file of this patent

UNITED STATES PATENTS 2,878,280     Berger et al. _____ Mar. 17, 1959